(12) United States Patent
Mattsson et al.

(10) Patent No.: US 9,804,604 B2
(45) Date of Patent: Oct. 31, 2017

(54) INTELLIGENT GROUNDS MANAGEMENT SYSTEM INTEGRATING ROBOTIC ROVER

(71) Applicant: HUSQVARNA AB, Huskvarna (SE)

(72) Inventors: Anders Mattsson, Ulricehamn (SE); Mikael Willgert, Spånga (SE); Martin Larsén, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/912,216

(22) PCT Filed: Aug. 14, 2014

(86) PCT No.: PCT/IB2014/063931
§ 371 (c)(1),
(2) Date: Feb. 16, 2016

(87) PCT Pub. No.: WO2015/022672
PCT Pub. Date: Feb. 19, 2015

(65) Prior Publication Data
US 2016/0195876 A1     Jul. 7, 2016

Related U.S. Application Data

(60) Provisional application No. 61/866,829, filed on Aug. 16, 2013.

(51) Int. Cl.
*G05D 1/02*         (2006.01)
*A01D 34/00*     (2006.01)
(Continued)

(52) U.S. Cl.
CPC ......... *G05D 1/0219* (2013.01); *A01D 34/008* (2013.01); *A01G 25/00* (2013.01);
(Continued)

(58) Field of Classification Search
CPC ...... A01G 25/16; A01G 25/00; A01D 34/008; G05D 1/0219; G05D 1/0265; G05D 2201/0208; Y10S 901/01
(Continued)

(56) References Cited

U.S. PATENT DOCUMENTS 4,532,757 A   8/1985   Tutle
4,843,561 A   6/1989   Larson
(Continued)

FOREIGN PATENT DOCUMENTS

CA   2918406 A1   1/2015
CN   1723751 A    1/2006
(Continued)

OTHER PUBLICATIONS

International Search Report and Written Opinion of corresponding application No. PCT/IB2014/063931, dated Jan. 6, 2015, all enclosed pages cited.

(Continued)

*Primary Examiner* — Tyler J Lee
(74) *Attorney, Agent, or Firm* — McNair Law Firm, P.A.

(57) ABSTRACT

A system may include sensor equipment, task performance equipment, a yard maintenance manager and a robot. The sensor equipment may include one or more sensors disposed on a parcel of land. The task performance equipment may be configured to perform a task on the parcel. The task may be associated with generating a result that is enabled to be monitored via the sensor equipment. The yard maintenance manager may be configured to interface with the sensor equipment and the task performance equipment to compare measured conditions with desirable conditions to direct operation of the task performance equipment. The robot may be configured to work the parcel and perform at least one of acting as one of the one or more sensors, acting as a device (Continued)

of the task performance equipment, or interacting with the sensor equipment or the task performance equipment.

17 Claims, 7 Drawing Sheets

(51) Int. Cl.
*A01G 25/16* (2006.01)
*A01G 25/00* (2006.01)

(52) U.S. Cl.
CPC ........... *A01G 25/16* (2013.01); *G05D 1/0265* (2013.01); *G05D 2201/0208* (2013.01); *Y10S 901/01* (2013.01)

(58) Field of Classification Search
USPC ................................................. 701/23–25, 50
See application file for complete search history.

(56) References Cited

U.S. PATENT DOCUMENTS

| | | | |
|---|---|---|---|
| 6,671,582 B1 | 12/2003 | Hanley | |
| 6,975,245 B1 | 12/2005 | Slater et al. | |
| 7,096,967 B2 | 8/2006 | Pohlman, Jr. et al. | |
| 7,574,284 B2 | 8/2009 | Goldberg et al. | |
| 8,215,570 B2 | 7/2012 | Hitt | |
| 8,275,506 B1 | 9/2012 | Bishel | |
| 8,321,365 B2 | 11/2012 | Anderson | |
| 8,359,142 B2 | 1/2013 | Hoffman et al. | |
| 8,744,626 B2* | 6/2014 | Johnson | A01D 34/008 700/250 |
| 9,471,063 B2* | 10/2016 | Ouyang | G05D 1/0265 |
| 2010/0038440 A1 | 2/2010 | Ersavas | |
| 2011/0166705 A1* | 7/2011 | Anderson | A01D 34/008 700/253 |
| 2011/0295424 A1 | 12/2011 | Johnson | |
| 2012/0283906 A1* | 11/2012 | Anderson | G05D 1/0219 701/25 |
| 2012/0290165 A1* | 11/2012 | Ouyang | G05D 1/0255 701/25 |
| 2013/0041526 A1* | 2/2013 | Ouyang | G05D 1/0265 701/2 |
| 2013/0110341 A1 | 5/2013 | Jones et al. | |
| 2013/0192183 A1* | 8/2013 | Choi | A01D 34/008 56/10.2 A |
| 2013/0204437 A1 | 8/2013 | Koselka et al. | |
| 2014/0078303 A1* | 3/2014 | Mattern | G07C 9/00087 348/148 |
| 2014/0303814 A1* | 10/2014 | Burema | A01B 79/005 701/3 |
| 2015/0234385 A1* | 8/2015 | Sandin | G05D 1/0265 700/258 |
| 2015/0366129 A1* | 12/2015 | Borinato | A01B 69/008 701/25 |

FOREIGN PATENT DOCUMENTS

| | | |
|---|---|---|
| CN | 101135911 A | 3/2008 |
| CN | 201402412 Y | 2/2010 |
| CN | 102845285 A | 1/2013 |
| CN | 202837960 U | 3/2013 |
| DE | 102009028990 A1 | 10/2010 |
| EP | 2338322 B1 | 12/2010 |
| EP | 2390741 A2 | 11/2011 |
| EP | 2286653 B1 | 4/2013 |
| GB | 2451069 A | 1/2009 |
| JP | H07284319 A | 10/1995 |
| JP | 3277529 B2 | 4/2002 |
| JP | 3503207 B2 | 3/2004 |
| JP | 2006068274 A | 3/2006 |
| JP | 2007139639 A | 6/2007 |
| JP | 4037341 B2 | 1/2008 |
| JP | 2008000019 A | 1/2008 |
| JP | 2008051839 A | 3/2008 |
| JP | 2011505626 A | 2/2011 |
| JP | 2012235712 A | 12/2012 |
| JP | 2016533736 A | 11/2016 |
| KR | 1020120044115 A | 5/2012 |
| WO | 2005034622 A1 | 4/2005 |
| WO | 2009070007 A1 | 6/2009 |
| WO | 2013081516 A1 | 6/2013 |

OTHER PUBLICATIONS

International Preliminary Report on Patentability of PCT/IB2014/063931 dated Feb. 16, 2016, all enclosed pages cited.

* cited by examiner

INTELLIGENT GROUNDS MANAGEMENT SYSTEM INTEGRATING ROBOTIC ROVER

TECHNICAL FIELD

Example embodiments generally relate to intelligent systems and, more particularly, relate to a system for intelligent grounds management that includes monitoring and grounds care servicing facilitated by a robotic rover.

BACKGROUND

Grounds care maintenance tasks may include lawn care and/or gardening tasks related to facilitating growth and manicuring the lawns or gardens that hopefully prosper as a result of those efforts. Facilitating growth has commonly required individuals to focus routine attention on ensuring growing conditions are appropriate for the vegetation being grown, and on providing the necessary care and grooming tasks to further enhance growth.

As technological capabilities have improved, various devices or sensors have been developed that are capable of employment to monitor various aspects of growing conditions. Gardeners have therefore been enabled to employ the sensors or devices in specific locations to monitor and correct, if needed, the growing conditions. However, even with the improvement of monitoring devices or sensors, gardeners are still often required to employ a high degree of manual interaction to place and/or operate the devices or sensors.

BRIEF SUMMARY OF SOME EXAMPLES

Some example embodiments may therefore provide a capability for intelligent control or management of a number of assets in connection with yard maintenance with the assistance or inclusion of a robotic rover (e.g., a robotic mower, watering device, and/or the like). Thus, for example, sensor equipment and task performance equipment operation may be coordinated with the assistance of a robotic rover for efficient gardening and lawn care.

According to an example embodiment, a system for providing a smart garden is provided. The system may include sensor equipment, task performance equipment, a yard maintenance manager and a robot. The sensor equipment may include one or more sensors disposed on a parcel of land. The task performance equipment may be configured to perform a task on the parcel. The task may be associated with generating a result that is enabled to be monitored via the sensor equipment. The yard maintenance manager may be configured to interface with the sensor equipment and the task performance equipment to compare measured conditions with desirable conditions to direct operation of the task performance equipment. The robot may be configured to work the parcel and perform at least one of acting as one of the one or more sensors, acting as a device of the task performance equipment, or interacting with the sensor equipment or the task performance equipment.

According to another example embodiment, a method of providing a smart garden is provided. The method may include receiving sensor data from sensor equipment including one or more sensors disposed on a parcel of land, determining current conditions on the parcel based on the sensor data, and comparing the current conditions to desirable conditions associated with vegetation planted on the parcel of land. The method may further include providing at least one instruction relative to operation of task performance equipment configured to perform a task on the parcel where the task is associated with generating a result that is enabled to be monitored via the sensor equipment. The method may also include employing a robot to work the parcel. The robot may perform at least one of acting as a sensor of the sensor equipment, acting as a device of the task performance equipment, or interacting with the sensor equipment or the task performance equipment.

Some example embodiments may improve the ability of operators to maximize the beauty and productivity of their yards and gardens, but do so in a cost effective and environmentally friendly way.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
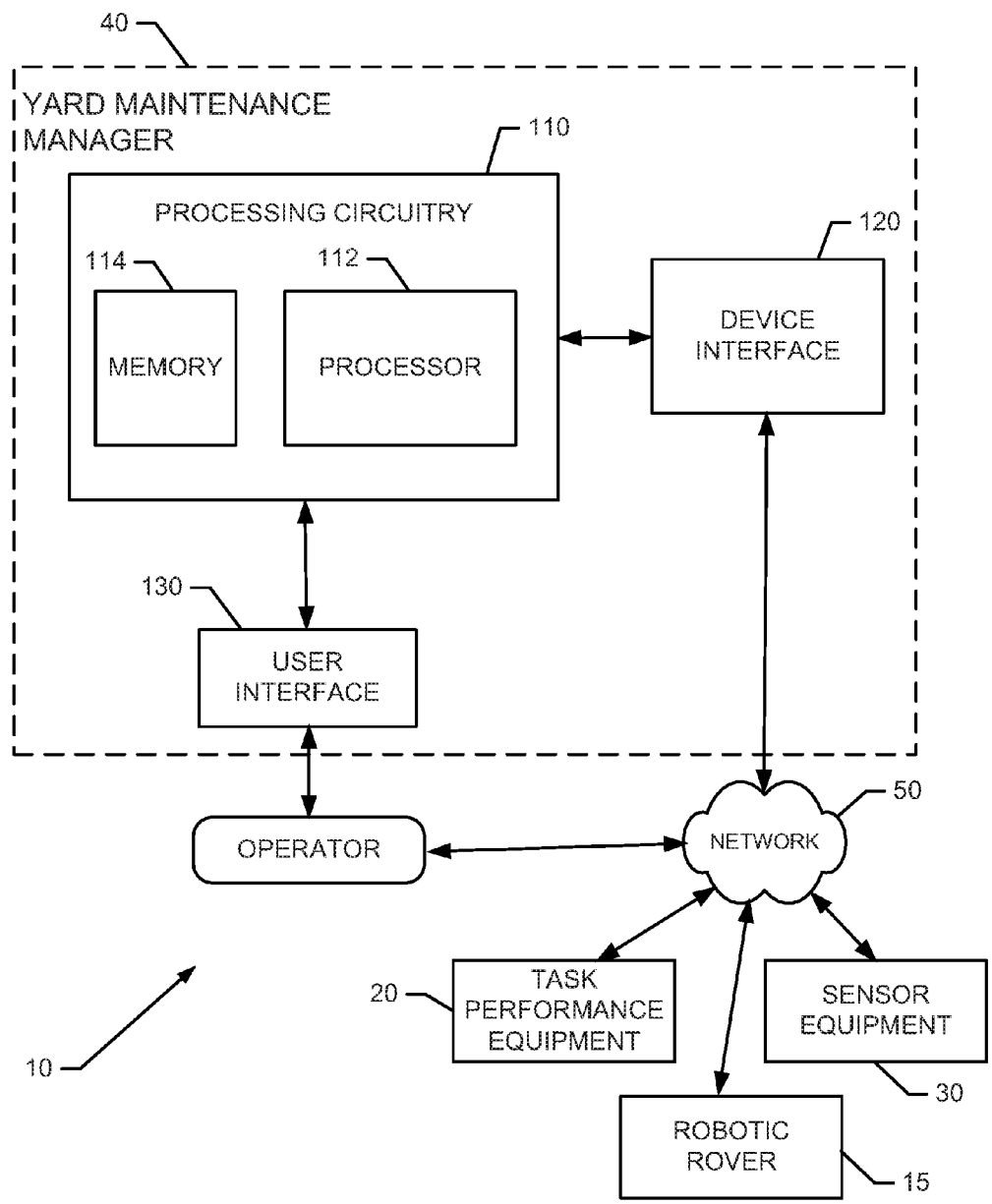
FIG. 1 illustrates a block diagram of a system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. Thus, yard maintenance should be appreciated to encompass gardening, lawn care, combinations thereof, and/or the like. As used herein, operable coupling should be understood to relate to direct or indirect connection that, in either case, enables functional interconnection of components that are operably coupled to each other.

Example embodiments may provide a comprehensive system for monitoring yard conditions (i.e., lawn and/or garden conditions) at any of what may potentially be a number of locations throughout a particular parcel, and performing tasks relative to those locations with the assistance of a mobile asset such as a robotic rover. In this regard, for example, the system may utilize a communication network that gathers information on growing conditions from sensor equipment for association of the information with the areas from which the information was gathered. The system may also employ processing circuitry to associate a set of optimal or desirable growing condition parameters with the various areas. When the information is received describing the growing conditions of the various areas, the processing circuitry may compare the growing conditions (i.e., current conditions) to the growing condition parameters (i.e., desired conditions) to determine whether and to what extent corrective actions may be needed to improve the growing conditions. The processing circuitry may receive the information from and/or communicate instructions to, a robotic rover. The robotic rover may provide a very high degree of flexibility and capability into the system with respect to mechanisms by which power, communication and task related services may be provided within the system.

The system may therefore employ any combination of fixed and/or mobile sensors that gather data that relates to specific segments of the parcel that may correspond to each respective one of the various areas mentioned above. The specific segments may have different types of plants therein, and therefore may optimally have different growing conditions desirable in connection with each respective one of the segments. The owner/operator may define the specific segments, which may be referred to as "zones," and identify the plants associated with each zone or the growing conditions desired for each zone. In some cases, the processing circuitry may be equipped to correlate desirable growing conditions to an identified plant species based on stored information associated with each plant species from a database or online resource. Accordingly, each zone will have corresponding growing condition parameters associated therewith, and the growing condition parameters may define the desired growing conditions (e.g., any or all of moisture level, temperature, lighting level, pH, and/or the like) for the corresponding zone. In some cases, the zones may further be associated with the corresponding task performance equipment that may be employed to alter the growing conditions in the respective zones and therefore act as potential resources for performing tasks. The resources may be associated with the zones in such a way as to define the specific resources (e.g., a resource list) that is available for use in any given zone. The processing circuitry may then either direct operation of assets from the resource list to achieve a desired outcome or may provide instructions or suggestions to the owner/operator regarding the assets from the resource list that could be employed to achieve a desired outcome. Alternatively, the processing circuitry may merely inform the owner/operator of the situation, and the owner/operator may be relied upon to take corrective actions as needed.

FIG. 1 illustrates a block diagram of a system 10 that may be employed to accomplish the basic operations described above in accordance with an example embodiment. Within the context of FIG. 1, it should be appreciated that certain tasks, like grass cutting, are typically performed by lawn mowers, which could be walk behind, ride on, or robotic models. Tasks such as soil preparation may be performed by tillers. Still other tasks, like lawn watering, may be performed by sprinkler heads at fixed locations or by the transportation of water via hoses to desired locations. The transportation could be accomplished manually, or via a robot or robotic rover 15. Robots or other devices could also be engaged to perform certain other yard maintenance tasks such as raking, fertilizing, lighting, wildlife dispersion and/or the like. Thus, it should be apparent that sprinklers, robots, tillers, mowers and the like, represent task performance equipment 20 that may be used to accomplish functional tasks relative to yard maintenance activities. The task performance equipment 20 may therefore serve as the assets or resources that may be used to achieve desired outcomes within the context of the system.

Meanwhile, various sensors may be employed by insertion of such sensors into soil for monitoring soil conditions (e.g., lighting levels, moisture levels, pH, temperature, video or image data, etc.) or by the transportation of such sensors using the robot. Other sensors could be placed nearby vegetation to monitor certain growing conditions either on a fixed or mobile platform. Thus, for example, sensors could be placed on the task performance equipment 20 in some cases. Regardless of the specific configuration or placement paradigm, the various sensors may represent sensor equipment 30, as described above.

The sensor equipment 30, and in some cases also one or more of the devices that comprise the task performance equipment 20, may be in communication with a yard maintenance manager 40 via a network 50. The network 50 may be a data network, such as a local area network (LAN), a metropolitan area network (MAN), a wide area network (WAN) (e.g., the Internet), a wireless personal area network (WPAN), and/or the like, which may couple client devices (e.g., the sensor equipment 30 and/or the task performance equipment 20) to devices such as processing elements (e.g., personal computers, server computers or the like) and/or databases such as the yard maintenance manager 40. Communication between the network 50, the client devices and the devices or databases (e.g., servers) to which the client devices are coupled may be accomplished by either wireline or wireless communication mechanisms and corresponding communication protocols. As such, for example, some or all of the sensors of the sensor equipment 30 may be connected to the yard maintenance manager 40 by wire and/or be wireless communication means. Meanwhile, some or all of the devices of the task performance equipment 20 may be connected to the yard maintenance manager 40 by wire or by wireless communication means. As such, for example, a remote terminal may be connected to the yard maintenance manager 40 by wire and/or wireless communication means.

It should also be appreciated that although the robotic rover 15 is illustrated separately in FIG. 1, the robotic rover 15 may act as one or both of a piece of sensor equipment 30 or a piece of task performance equipment 20. However, given the ability of the robotic rover 15 to act as either or both of a piece of sensor equipment 30 or a piece of task performance equipment 20 and the ability of the robotic rover 15 to facilitate operation of the sensor equipment 30 and/or the task performance equipment 20 even when the robotic rover 15 does not necessarily act as one or the other of such devices, the robotic rover 15 is shown separately in FIG. 1. It should also be appreciated that the yard maintenance manager 40 could reside on the robotic rover 15, at the charging station of the robotic rover 15, or could reside remotely from the robotic rover 15 (e.g., residing at a computer, server or smart phone). Where the yard maintenance manager 40 resides at the robotic rover 15, the processing circuitry of the robotic rover and the processing circuitry of the yard maintenance manager 40 could be the same, or both could be embodied on coprocessors of the same platform.

As shown in FIG. 1, the yard maintenance manager 40 may include processing circuitry 110 that may be configured to perform data processing, control function execution and/or other processing and management services according to an example embodiment of the present invention. As such, it may be appreciated that the yard maintenance manager 40 could be embodied as a computer, smart phone, server, or other computing device. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. In some embodiments, the processing circuitry 110 may communicate with electronic components of the sensor equipment 30 and the task performance equipment 20 via the network 50 (which may include one or more communication networks). The network 50 may be localized such that it is associated with a single parcel, or may extend over and include a plurality of parcels.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons or a keyboard), and/or other input/output mechanisms (e.g., microphone, speakers, cursor, joystick, lights and/or the like). The user interface 130 may be configured to provide alerts, warnings and/or notifications to the user or operator responsive to various trigger conditions being detected (e.g., via the sensor equipment 30 or other components). In some cases, the user interface 130 may be configured to generate such alerts, warnings and/or notifications in response to plant growing conditions being out of specification or out of recommended ranges. System malfunctions, damage or tampering with equipment, equipment theft and other component related stimuli may also be defined as triggers for generation of the alerts, warnings and/or notifications. The alerts, warnings and/or notifications may be generated via light, sound, visual display, or other devices that may be connected to or part of the yard maintenance manager 40. In some cases, the notifications may be provided by text message or email.

The device interface 120 may include one or more interface mechanisms for enabling communication with other devices via the network 50. In some cases, the device interface 120 may be any means such as a device or circuitry embodied in either hardware, or a combination of hardware and software that is configured to receive and/or transmit data from/to sensors of the sensor equipment 30 and devices of the task performance equipment 20 in communication with the processing circuitry 110 by virtue of the device interface 120 being capable of sending and receiving messages via the network 50. In some example embodiments, the device interface 120 may provide interfaces for communication of components internal to the system 10 with components external to the system 10. For example, in an embodiment in which the yard maintenance manager 40 is embodied as a computer or a server, the device interface 120 may enable communication (e.g., via the internet or wireless communication methods) with a smart phone of the owner/operator. This communication may also occur via the network 50 (or via a sub-network of the network 50) in some cases. However, it should also be appreciated that the owner/operator may directly interact with the yard maintenance manager 40 via the user interface 130.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the yard maintenance manager 40. As such, in some embodiments, the processor 112 (or the processing circuitry 110) may be said to cause each of the operations described in connection with the yard maintenance manager 40 by directing the yard maintenance manager 40 to undertake the corresponding functionalities responsive to execution of instructions or algorithms configuring the processor 112 (or processing circuitry 110) accordingly. As an example, the yard maintenance manager 40 may be configured to receive sensor information from the sensor equipment 30 and make decisions regarding information to be provided to the owner/operator and/or instructions to be provided to task performance equipment 20. The processing circuitry 110 may, in some cases, process the condition information received from the sensor equipment 30 and compare the condition information to growing condition parameters that are stored in the memory 114 for a given zone.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the yard maintenance manager 40 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from the sensor network. Among the contents of the memory 114, applications may be stored for execution by the processor 112 in order to carry out the functionality associated with each respective application. In some cases, the applications may include a comparison of information indicative of current growing conditions detected in a zone to stored information about growing condition parameters that are desired for the vegetation that is in the zone. As indicated above, the growing condition parameters may be entered by the operator or may be extracted or retrieved from databases or sources accessible via the Internet based on entry of an identity of the plant vegetation in a given zone.

Figure 2:
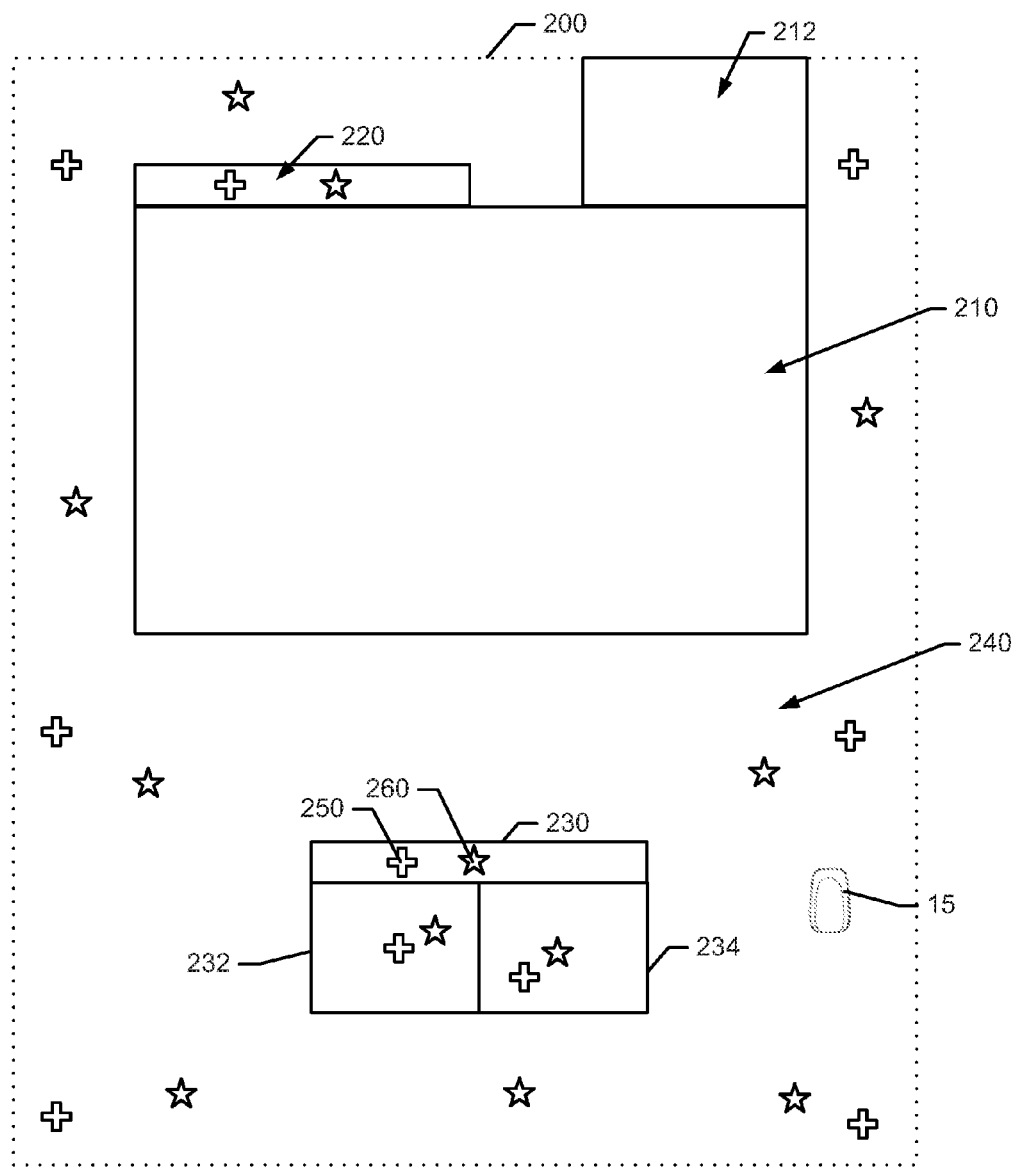
FIG. 2 illustrates a diagram of a parcel that is divided into various zones according to an example embodiment.

As mentioned above, the parcel (or parcels) for which the yard maintenance manager 40 provides service may be divided into zones. Each zone could be monitored and managed based on the specific different growing conditions that are desirable for the vegetation provided therein. FIG. 2 illustrates a diagram of a parcel 200 that is divided into various zones. Some of the zones may be active zones while other zones may be inactive zones. Active zones may be zones that include or otherwise permit access to the sensor equipment 30 and/or the task performance equipment 20. The inactive zones may be zones that either do not include or do not permit access to the sensor equipment 30 and/or the task performance equipment 20, or areas for which, regardless of the capability for monitoring and task performance, such activities are not desired. As such, for example, an inactive zone may include an area that is covered by a house, concrete, pavement, or land that is fallow or simply not desired for active management. In FIG. 2, a first inactive zone 210 is defined to outline the footprint of a house, and a second inactive zone 212 is defined to outline the footprint of a driveway leading to the house.

A first active zone 220 is provided at the front of the house and may represent a plant bed. A second active zone 230, a third active zone 232 and a fourth active zone 234 are provided in the back yard and may represent a garden. The remainder of the yard may represent a fifth active zone 240. Of note, in this example, the first active zone 220 covers a relatively large portion meant to represent the entire plant bed. Meanwhile, the fifth active zone 240 represents the entire yard that is not either inactive or associated with the garden. However, these segmentation examples are merely exemplary in order to present a relatively simple example to facilitate explanation of an example embodiment. Thus, it should be appreciated that the plant bed and the yard could further be broken up into one or more other (e.g., smaller) zones, if desired. Similarly, although the garden is broken up into smaller zones in this example, it should be appreciated that the garden could be further broken up as well. Moreover, individual plants, rows of plants and/or the like, could be designated to form their own zones in some cases. Likewise, within the yard, one or more trees, bushes or other specific plants could be identified as their own respective zones. As such, in some cases, embodiments could be practiced without any use of zones at all. Instead, for example, individual sensors (and/or task performance equipment) could be correlated to respective different plants and therefore to the growing conditions that are suitable or preferred for the respective different plants.

The zones (if used) may be programmed into the yard maintenance manager 40 and the yard maintenance manager 40 may also be aware of the sensor equipment and task performance equipment that is associated with each respective zone. In some cases, the zones may simply be identified and a corresponding association with assets (e.g., sensors and task performance equipment) may also be programmed to correlate each asset to one of the zones (or multiple ones of the zones) without any need for association of the zones with any map data. However, in some embodiments, the parcel 200 may be defined in terms of corresponding map data and the zones may be defined with respect to the map data. In such an example, a display similar to that illustrated in FIG. 2 may be provided to represent the parcel 200. In examples where map data is not desired or otherwise used, the image of FIG. 2 may merely represent the physical layout of the assets, but the yard maintenance manager 40 need not necessarily have an appreciation for the actual geographical layout. Instead, the yard maintenance manager 40 may be configured to just maintain data associations between information received, the zones to which the data correlates, and the assets in the zones. As mentioned above, the yard maintenance manager 40 may also have the ability to record information programmed regarding desirable growing conditions where such information is either programmed directly by the operator or is accessed based on an identification of the plant life that resides within the corresponding zone.

In some embodiments, for example, the memory 114 may store a parcel descriptor file including map data defining boundaries of the parcel 200, boundaries of the zones and/or location information identifying the location of assets (e.g., sensor equipment 30 and task performance equipment 20) located on the parcel 200. In some cases, the locations and/or boundaries may be identified based on GPS coordinates, triangulation using radio beacons or distance/direction from another known locations or positions. Image data may be used to confirm or assist in finding boundaries in some situations. Alternatively or additionally, boundary and/or location information may be learned (e.g., by a robot such as the robotic rover 15 driving proximate to the boundary or location and noting the same (e.g., using RFID technology or the like)). When a boundary or device location is encountered, the map data of the parcel descriptor file may be accessed (via the processing circuitry 110) to record the corresponding information in association therewith. As such, in some embodiments, the boundary wire defining the work area of the robotic rover 15 may correspond to the boundary of one or more of the zones.

As mentioned above, the robotic rover 15 may enhance the capabilities of the system 10, or the robotic rover 15 may serve as one or more of the other components (e.g., the sensor equipment 30 or the task performance equipment 20) of the system 10. As an example, as shown in FIG. 2, each zone may have one or more components of fixed sensor equipment and task performance equipment associated therewith. For example, moisture sensor 250 (indicated by a cross) may be accompanied by a corresponding sprinkler 260 (indicated by a star). Other crosses in the image of FIG. 2 may represent other sensors (e.g., moisture sensors), and other stars may represent other task performance equipment (e.g., sprinklers) associated with other zones. Moreover, in some cases, one or more of the sprinklers may be operable via actuation of an actuator 265. The actuator 265, and other actuators in the system, may be associated with one or more electric, hydraulic or otherwise locally or remotely operable devices that can take one or more other devices into or out of service when operated.

In some embodiments, a single sensor of any given type may be associated with a given zone. Thus, in such an example, although the second active zone 230 shows one moisture sensor 250. However, a pH sensor, a temperature sensor, a camera, and/or a light sensor could also be included in the second active zone 230. By providing only one sensor of any given type per zone, the sensor data gathered from each respective sensor may be easily understood to represent the conditions for the entirety of the zone. In such an example, one piece of task performance equipment of any given type may also be employed in the simplest examples (as shown for the garden and the plant bed in FIG. 2). Moreover, in some cases, there may be one piece of task performance equipment associated with each respective sensor of a given type. In fact, in some cases, there may be a limit to the distance that is permitted to be placed between a sensor of a given type (e.g., a moisture sensor) and a piece of task performance equipment that corresponds to the sensor (e.g., a sprinkler). Thus, for example, each moisture sensor may be no more than a given distance from a corresponding sprinkler. Moreover, in some cases, the sprinkler and moisture sensor may be integrated with each other. However, it should be appreciated that, dependent upon the characteristics of the task performance equipment (and potential obstacles), it may be desirable for multiple pieces of task performance equipment to be provided in one or more of the zones, or in association with a sensor of a given type. Similarly, it may be desirable for multiple sensors to be associated with a single piece of task performance equipment.

In other embodiments, multiple sensors (even of a given type) and multiple pieces of task performance equipment (even of a given type—lighting element, watering device, fertilizer, trimmer, mower, camera, etc.) may be associated with a given zone. However, it should be appreciated that in such an embodiment, the associations of different assets within the zone may effectively (or actually), although not necessarily, create sub-zones that can be collectively or individually managed. The fifth active zone 240 is an example of such a zone.

For physical connections made between assets, wiring and/or hose connections for power, communication or other sourcing services may be accomplished in any desirable fashion, but may be programmed into or otherwise known by the yard maintenance manager 40. Wireless communications (if employed) may be accomplished by short range or other radios that may be in communication with sensors or other assets. For example, Bluetooth, WiFi, Zigbee, RFID (near field communication), GSM, or other proprietary or standard based communication mechanisms may be employed. In some embodiments, if one or more sensors are collocated with each other or with task performance equipment, a group of devices may communicate with a communication hub (which may be one of the sensors or devices) and the hub may wirelessly (or via wired connection) report data to the yard maintenance manager 40. Power may also be supplied locally by battery or solar cells that may be disposed proximate to one or more of the assets, or by power cables routed to one or more of the assets.

When the assets include sprinklers, the sprinklers may be provided with water from one or more hose or pipe connections. In some cases, multiple sprinklers may be sourced from the same hose (e.g., in series or parallel). Control over sprinkler operations may be accomplished by charging the hose without local control or by charging the hose and taking individual control over valves provided for local control of each sprinkler via electronic control. Other irrigation tools (e.g., an irrigation crane) may also be used in other example embodiments.

In some embodiments, in addition to employing the fixed assets described above, one or more mobile assets may be employed. Within such a context, for example, a robotic mower or watering device may be used to facilitate collection of data and/or the execution of tasks. Although any mobile asset could be employed, an example embodiment will be described herein within the context of a robotic lawn mower or watering device acting as the robotic rover 15. As described above, the robotic robot 15 (or "robot") may work within a work area defined by a boundary wire or other method. In some cases, the robot may perform a task (e.g., grass cutting or lawn watering (e.g., via transport of a small (e.g., 5 mm or less) hose linked to a water source via a hose reel) over the parcel 200. The robot may be equipped with an RFID reader to read the RFID tag of one or more sensors and/or pieces of task performance equipment. In some cases, the robot may include a positioning module that is capable of noting the location at which one or more RFID tags was read. Accordingly, the robot may be able to obtain geographic location information for mapping the location of assets. As such, the locations of devices in the system 10 may be learned.

Alternatively or additionally, in some cases, the robot may further read data from the corresponding sensors that it encounters while operating. The robot may store such data or transmit it to the yard maintenance manager 40 wirelessly. If the data is stored, the data may be transmitted to the charging station or a communication device associated therewith when the robot docks for charging. The communication device may then communicate the data to the yard maintenance manager 40. In some cases, the boundary wire may be used to power the sensors and/or the communication device. Moreover, in some cases, the boundary wire could even be used as a temporary or ad hoc transmission asset (e.g., acting as an antenna).

In some examples, low power short range communications may be used between the robot and the sensors, communication hubs, and/or task performance equipment. Then the robot may use higher power communications to pass information on to the yard maintenance manager 40 and receive instructions therefrom. Alternatively, the robot may also use low power communications when docked for recharging. The robot may then again use low power short range communications to direct certain activities such that the overall power consumption is kept low by ensuring that a minimum amount of power is used for system communications.

Furthermore, in some embodiments, the robot itself may be used to power the sensors when the robot is proximate to the sensors. In this regard, similar to the operation of an RFID tag, the robot may radiate signals that can be used by sensors proximate thereto to take measurements and transmit data measured to the robot. In some cases, the sensors may also incorporate an energy store that can be charged, thereby allowing the sensors to operate also when the robot is not proximate. Thus, for example, inductive power provision may be accomplished to transfer power to remote assets within the system. Power transfer or communication in this manner can be accomplished at relatively low power levels due to the proximity of the robot to the sensors or other devices that are being powered and/or communicated with. Some task performance equipment may also be provided with power in this manner.

In some embodiments, the robot may further act as a mobile sensor. In this regard, for example, the robot may carry a camera on board and the camera may record video or obtain image data associated with respective locations or zones. The image data, in addition to its potential use in location determination described above, may be analyzed to determine the color, size or length of vegetation or may be used to augment security functions. Information regarding color, size or length of vegetation may then be used to determine the growing conditions impacting the vegetation.

In some embodiments, the robot may be equipped with sensors capable of measuring the resistance between the wheels of the robot as the robot transits over ground. The resistance measurements may be stored in association with the location at which the measurements are gathered. As an alternative (or addition) to recording resistance, the power needed to cut vegetation in different areas may be recorded. Power and/or resistance measurement data may be transmitted to the yard maintenance manager 40 for storage and comparison to future measurements in order to determine current conditions, or at least relative changes in conditions. The yard maintenance manager 40 may then adjust watering, lighting, fertilizing instructions to modify growing conditions accordingly. As such, the robot may be configured to sense water distribution patterns and feed the information back into the system 10 so that setup and calibration may be achieved for optimal performance. Furthermore, even for zones that might not have vegetation (e.g., the second inactive zone 212), the robot could be programmed to perform a task (e.g., raking or sweeping proximate to a walkway or drive way).

Other sensors or functional components may also be integrated into or otherwise provided onto the robot. For example, temperature sensors, cameras, radio receivers/transmitters, watering tools, cutting devices, moisture sensors, light sensors, lighting devices, and/or the like may be included with the robot to enable condition checks to be made at random or specifically selected locations throughout the parcel 200. Thus, the robot may act as a mobile platform capable of hosting one or more sensors and, in some cases, one or more task performance devices. However, as indicated above, the robot may also interact with (or even power) fixed sensors and/or task performance equipment.

As such, for example, watering (or some other task) may be commenced and the system 10 may employ the sensor equipment 30 in combination with operation of the robotic rover 15 to monitor the distribution of the water (or fertilizer, etc.). The sensor equipment 30 may be transported to different locations, or may data may be collected at different locations by the robotic rover 15 and then be used to provide feedback via the yard maintenance manager 40 to direct more or less watering (or other resource utilization) in certain areas.

In some cases, the robotic rover 15 may be controlled to ensure that synchronization or sequencing can occur relative to the tasks performed on the parcel 200. For example, mowing can be secured while watering occurs in a given zone, or mowing can be planned a specific given time after watering has been accomplished. Moreover, since in some cases the sensor equipment 30 can detect natural watering (e.g., rain) and irrigation efforts, the yard maintenance manager 40 may be enabled to manage resource consumption to optimize water utilization based on prevailing weather conditions. For example, if a rain event is detected, watering may be postponed. In some cases, the magnitude of a rain event may also be detected so that watering postponement may be accomplished for a time that is proportional to the amount of rain received. In still further examples, if the network 50 enables the yard maintenance manager 40 to obtain weather forecast information (e.g., from the internet), then watering may be postponed even if a rain event has not yet occurred (e.g., if the rain event is forecast to occur within a given time period of an otherwise scheduled or apparently needed watering event). Thus, for example, the yard maintenance manager 40 may access weather information from sites associated with the location of the parcel 200, or the yard maintenance manager 40 may be enabled to utilize a subscription to a weather service to obtain forecast information.

Figure 3:
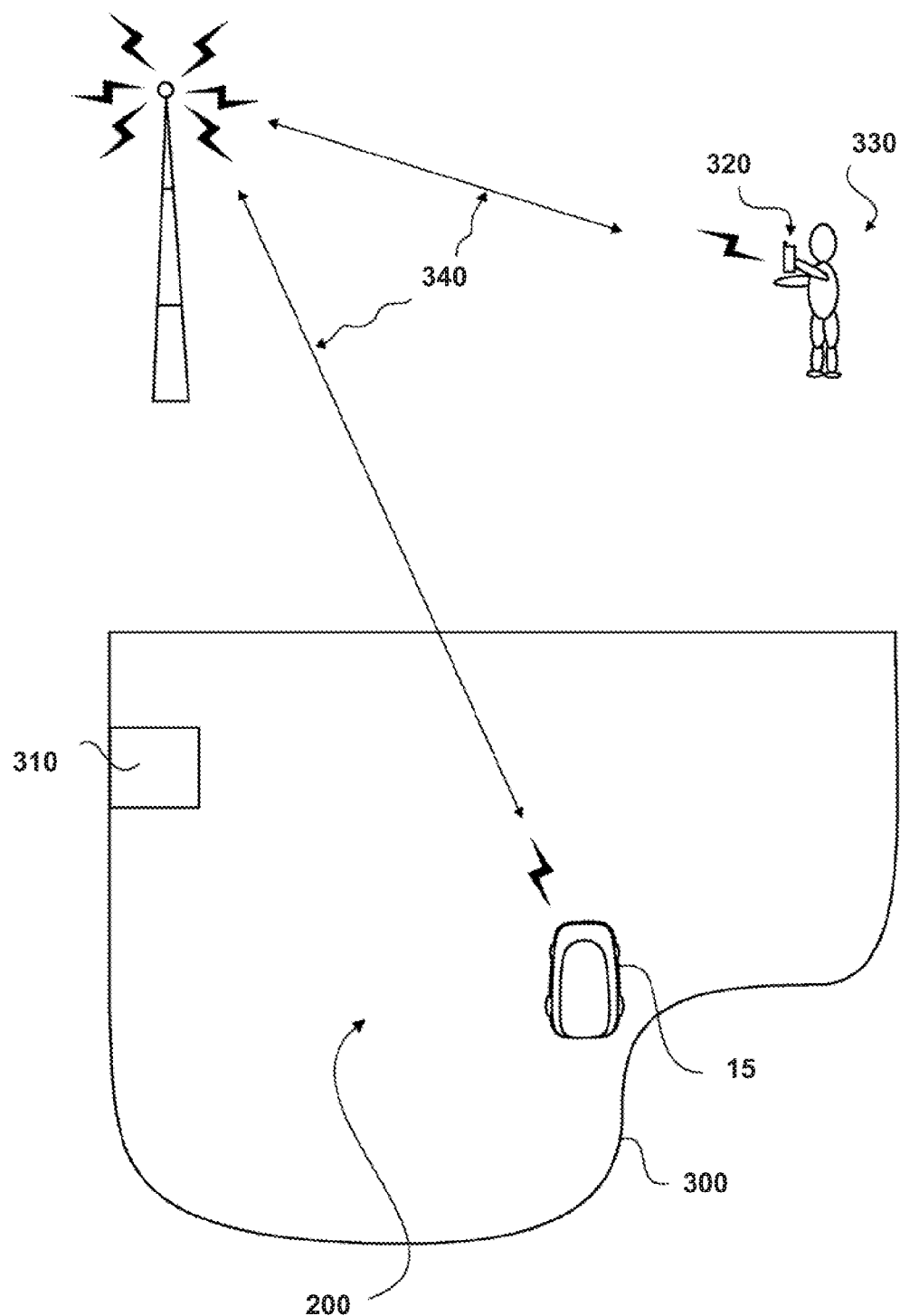
FIG. 3 illustrates an example operating environment for a robotic mower that may employ an example embodiment.

In some example embodiment, the robotic rover 15 may be configured to operate within an area that is defined by a boundary wire. The robotic rover 15 then roams within the bounded area to ensure that the entire area is serviced. FIG. 3 illustrates an example operating environment for the robotic rover 15 that may employ a system bounded by such a boundary wire. The robotic rover 15 may operate to cut grass on the parcel 200 (i.e., a land lot) or in a zone, the boundaries of which may be defined using one or more physical boundaries (e.g., a fence, wall, curb and/or the like), learned positional boundaries, a boundary wire 300 or combinations thereof. The boundary wire 300 may emit electrical signals that are detectable by the robotic rover 15 to inform the robotic rover 15 when a boundary of the parcel 200 (or zone) has been reached. The robotic rover 15 may be controlled, at least in part, via control circuitry located onboard. The control circuitry may include, among other things, the ability to detect the boundary wire 300 to redirect the robotic rover 15 to other areas within the parcel 200. The control circuitry may also control a positioning module that uses GPS, radio beacon triangulation, odometry or other means to determine location (e.g., its own, or the location of devices encountered).

In an example embodiment, the robotic rover 15 may be battery powered via one or more rechargeable batteries. Accordingly, the robotic rover 15 may be configured to return to a charge station 310 that may be located at some position on the parcel 200 in order to recharge the batteries. The batteries may power a drive system and a functional control system of the robotic rover 15. However, the control circuitry of the robotic rover 15 may selectively control the application of power or other control signals to the drive system and/or the functional control system to direct the operation of the drive system and/or functional control system. Accordingly, movement and operation of the robotic rover 15 over the parcel 200 may be controlled by the control circuitry in a manner that enables the robotic rover 15 to systematically traverse the parcel 200 while operating to perform a function on the work area of the parcel 200. In some embodiments, the control circuitry may be configured to communicate wirelessly with an electronic device 320 (e.g., a computer, mobile telephone, PDA, smart phone, and/or the like) of a remote operator 330 via communication links 340 of a wireless communication network (e.g., network 50).

In some embodiments, the robotic rover 15 may further include a mechanical operator of some sort. In this regard, for example, the sprinklers of some embodiments could be embodied as irrigation cranes that may be mechanically turned on or off by the mechanical operator of the robotic rover 15. In such an embodiment, when directed, the robotic rover 15 may go to the location of one or more mechanical cranes that are to be turned on (or off) and the robotic rover 15 may engage the corresponding irrigation cranes with the mechanical operator to accomplish the desired result. Thus, in various example embodiments, the robotic rover 15 may interact with sprinklers, valves, actuators, cranes, etc., in either a mechanical or electrical manner in order to turn such devices on or off responsive to instruction by the yard maintenance manager 40 based on sensed conditions.

Accordingly, the robotic rover 15 may be configured to facilitate activity related to data collection (enabling low power near field or other short range communication), power provision, direct task performance and indirect task performance (e.g., via equipment manipulation via electrical or mechanical methods). Battery replacement needs or power consumption in general may therefore be kept to a minimum. Moreover, given the ability of the robotic rover 15 to act as a mobile sensor, it may be possible in some cases to use the robotic rover 15 as the only sensor or sensing device platform within the system 10. The robotic rover 15 may facilitate placement of devices within the system through detection and calibration techniques via the provision of feedback regarding the distribution of water or other growing condition changing resources over the parcel 200.

Figure 4:
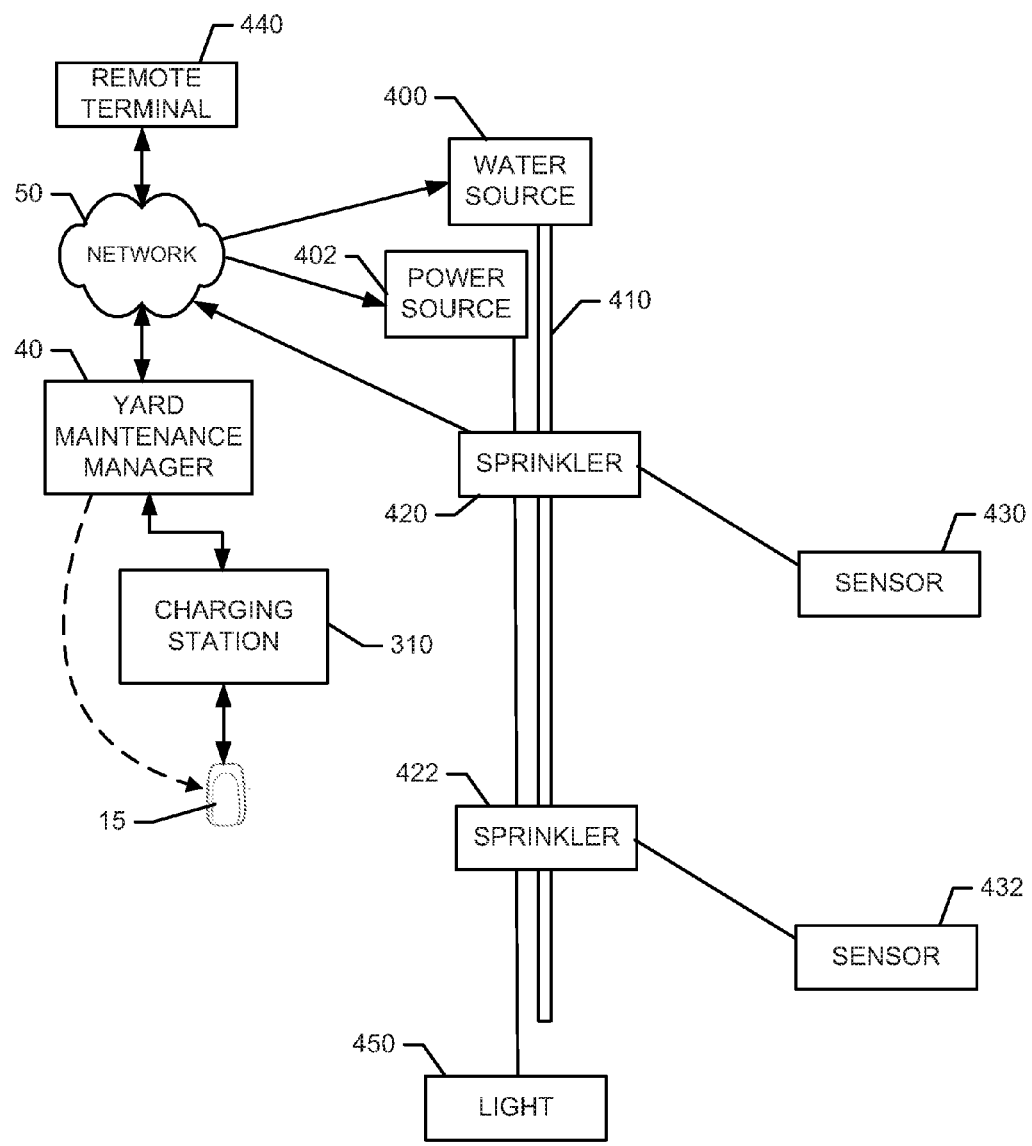
FIG. 4 illustrates a simple water migration path with power provided to sensors remotely according to an example embodiment.

FIG. 4 illustrates a simple water migration path that may be practiced in connection with an example embodiment. As shown in FIG. 4, a water source 400 may be used to charge a water line 410. A first sprinkler 420 and a second sprinkler 422 may receive water from the water line 410. The water line 410 may be selectively charged to provide water for spraying from the first and second sprinklers 420 and 422. In this example, a power source 402 may also be provided to power various system components. In some cases, the power source 402 may power the sprinklers, actuators of the sprinklers and/or the sensors of the system (including first sensor 430 and second sensor 432). As shown in FIG. 4, the yard maintenance manager 40 may communicate with the robotic rover 15 either directly via a wireless link, or via the charging station 310 when docking occurs. An operator may also interact with the system via the network using a remote terminal 440. Other system components (e.g., light 450) may also be controlled in accordance with some example embodiments.

In an example embodiment, the memory 114 may store (or the processor 112 may otherwise access) the database (e.g., a plant ID database) described above. Such database may correlate certain plants to the corresponding growing conditions that are ideal or preferred for optimal growth. As described above, current conditions may be monitored by the sensor equipment 30 and compared to the information in the database to determine any corrective action to be taken via the task performance equipment 20. Reduced costs and reduced environmental impact may therefore be achieved while achieving more optimal growing conditions.

In some cases, the yard maintenance manager 40 may take automated action to improve growing conditions by controlling watering, fertilizing, cutting, lighting or other activities based on a determination that current conditions are not optimal. However, in other situations, the yard maintenance manager 40 may be configured to provide an alert or instructions locally or via a smart phone or other remote device, to instruct or otherwise inform the owner/operator that some changes to current conditions may be advisable. The specific actions recommended may be identified, or an alert to check certain conditions may be provided. Camera data may also be used to activate certain components to chase away undesirable wildlife under certain circumstances. Accordingly, a relatively robust system for control of yard conditions (e.g., garden or lawn conditions) may be provided in an automated fashion. The result may be deemed to operate as a "smart garden" that provides efficient control to achieve optimal growing conditions.

In some embodiments, the operator may interact with the yard maintenance manager 40 via the user interfaces described herein or via a remote terminal 131. Some of the task performance equipment 20 may also have user interfaces. For example, a watering system may include one or more sprinklers with a common control unit that is regarded as part of the task performance equipment 20. Configuration of the common control unit or other such specific equipment may be handled locally at the equipment and then transferred to the yard maintenance manager 40 to be incorporated into the system configuration database. Thus, there may be additional user interfaces over and above those described herein.

Figure 5:
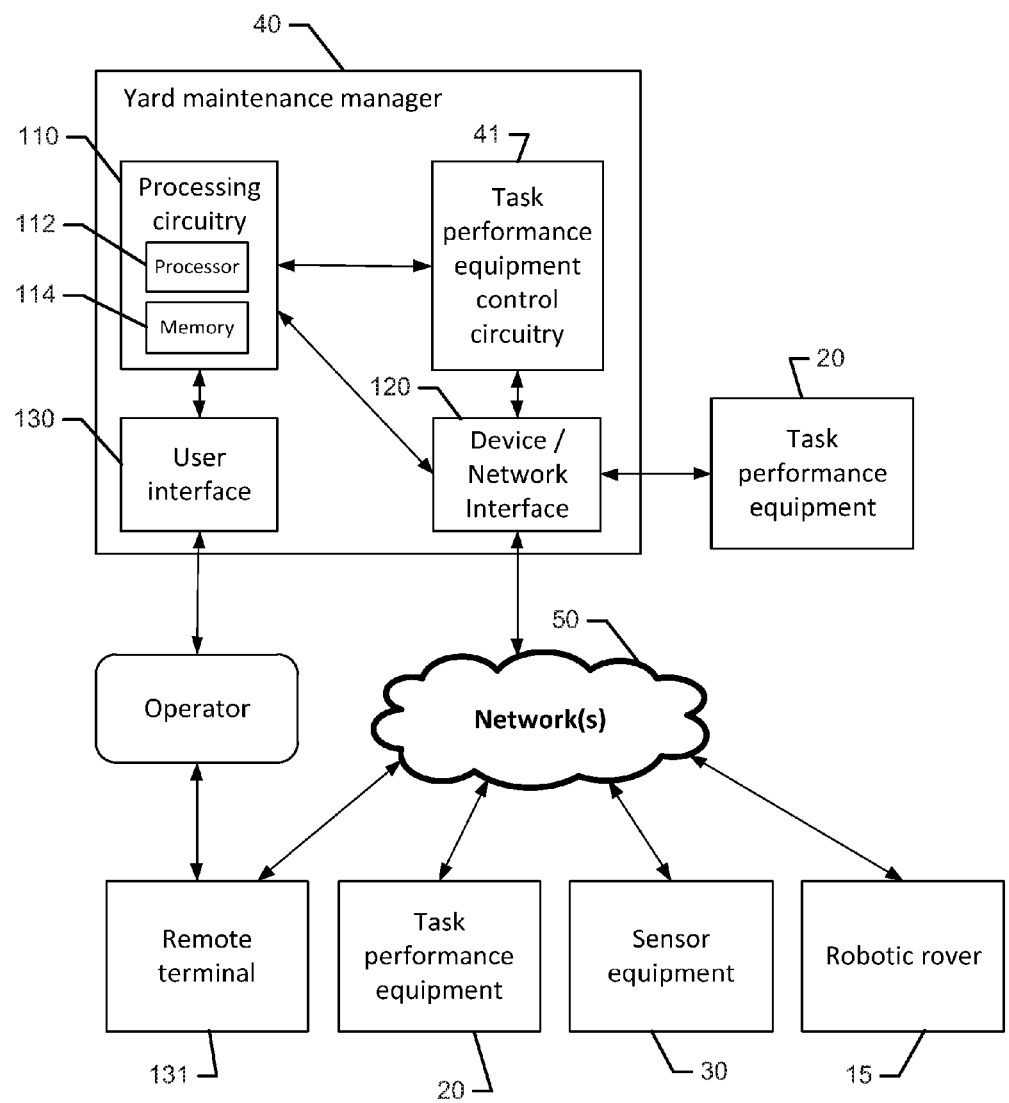
FIG. 5 illustrates a block diagram of a system having task performance equipment control circuitry integrated into the yard maintenance manager in accordance with an example embodiment.

In some embodiments, the yard maintenance manager 40 may be further modified to include task performance equipment control circuitry 41 as shown in the example of FIG. 5. The task performance equipment control circuitry 41 may be embodied as or by a separate processor or may be embodied by configuration of the processing circuitry 110 of the yard maintenance manager 40. In any case, the task performance equipment control circuitry 41 may interface with the task performance equipment 20 either directly or via the network 50, as shown in FIG. 5.

Embodiments of the present invention may therefore be practiced using an apparatus such as the one depicted in FIG. 1. However, other embodiments may be practiced in connection with a computer program product for performing embodiments of the present invention. As such, for example, each block or step of the flowcharts of FIG. 6, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 114) and executed by processing circuitry (e.g., processor 112).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 6. Moreover, other methods derived from the descriptions provided herein may also be performed responsive to execution of steps associated with such methods by a computer programmed to be transformed into a machine specifically configured to perform such methods.

Figure 6:
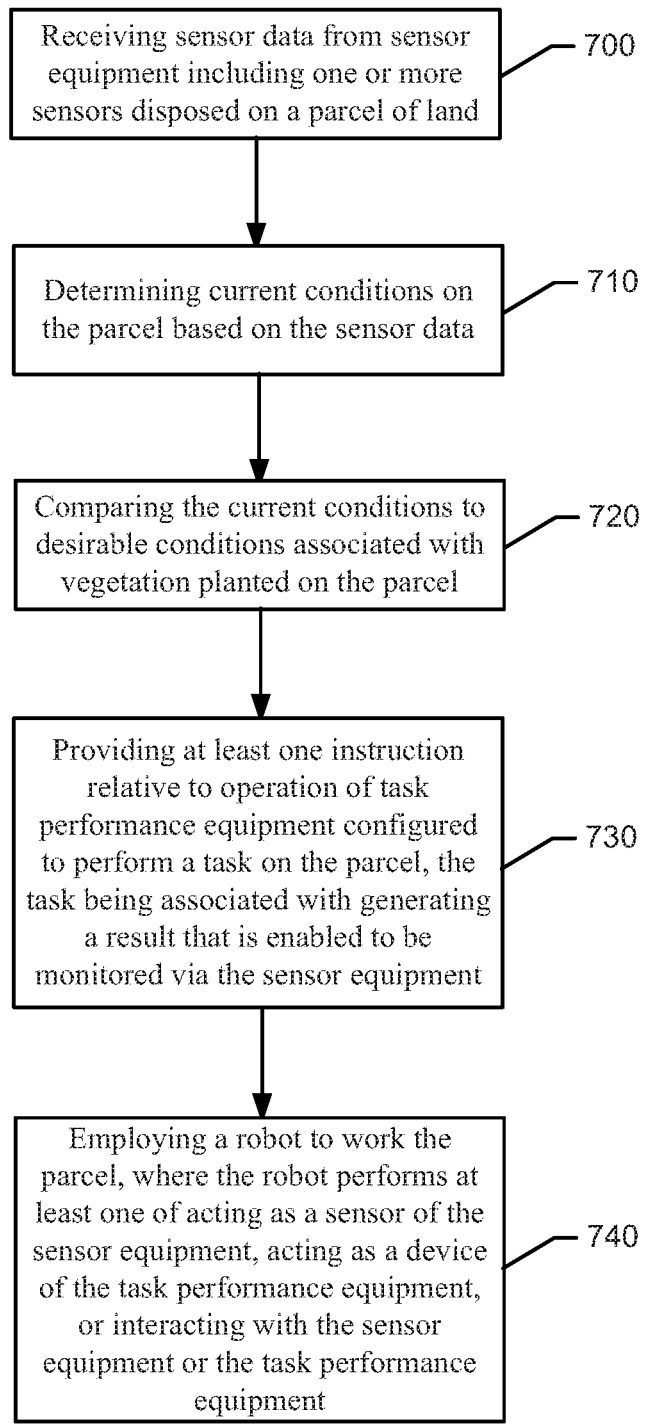
FIG. 6 illustrates a block diagram of a method according to an example embodiment.

In an example embodiment, a method for providing smart garden management, as shown in FIG. 6, may include receiving sensor data from sensor equipment including one or more sensors disposed on a parcel of land at operation 700, determining current conditions on the parcel based on the sensor data at operation 710, comparing the current conditions to desirable conditions associated with vegetation planted on the parcel of land at operation 720, and providing at least one instruction relative to operation of task performance equipment configured to perform a task on the parcel, the task being associated with generating a result that is enabled to be monitored via the sensor equipment at operation 730. The method may further include employing a robot to work the parcel, where the robot performs at least one of acting as a sensor of the sensor equipment, acting as a device of the task performance equipment, or interacting with the sensor equipment or the task performance equipment at operation 740.

In an example embodiment, an apparatus for performing the method of FIG. 6 above may comprise a processor (e.g., the processor 112) configured to perform some or each of the operations (700-740) described above. The processor 112 may, for example, be configured to perform the operations (700-740) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-740 may comprise, for example, the yard maintenance manager 40. Additionally or alternatively, at least by virtue of the fact that the processor 112 may be configured to control or even be embodied as the yard maintenance manager 40, the processor 112 and/or a device or circuitry for executing instructions or executing an algorithm for processing information as described above may also form example means for performing operations 700-740.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations described herein may be utilized in some embodiments. In this regard, in some cases, the parcel may be divided into a plurality of zones and each zone may be associated with at least one sensor and at least one device of the task performance equipment. In some cases, the yard maintenance manager may include processing circuitry storing map data descriptive of the parcel and each of the zones is defined by a corresponding geographic description relative to the map data. In an example embodiment, each of the zones may be associated with plant data corresponding to at least one plant within a respective one of the zones, and the plant data may define desirable parameters for growth of the at least one plant. In some embodiments, the yard maintenance manager may compare the measured conditions from the at least one sensor of a particular zone to the plant data associated with the particular zone to determine whether to control the task performance equipment relative to the particular zone to alter conditions in the particular zone. In some embodiments, the sensor equipment may be powered from the robot responsive to the robot passing within a predetermined distance of respective devices of the sensor equipment. In some examples, the sensor equipment may communicate with the robot responsive to the robot passing within a predetermined distance of respective devices of the sensor equipment. In an example embodiment, the robot may operate relative to a boundary defined by boundary wire, and the boundary wire may be used to power at least one sensor of the sensor equipment. In some embodiments, the robot is configured to detect information indicative of locations of assets among the sensor equipment or the task performance equipment and communicate the detected information to the yard maintenance manager to enable the yard maintenance manager to determine locations of the assets relative to the parcel. In some cases, the robot is configured to carry at least one sensor of the sensor equipment and/or is configured as a device of the task performance equipment. In an example embodiment, the yard maintenance manager may be configured to synchronize or sequence operation of different types of devices of the task performance equipment.

Figure 7:
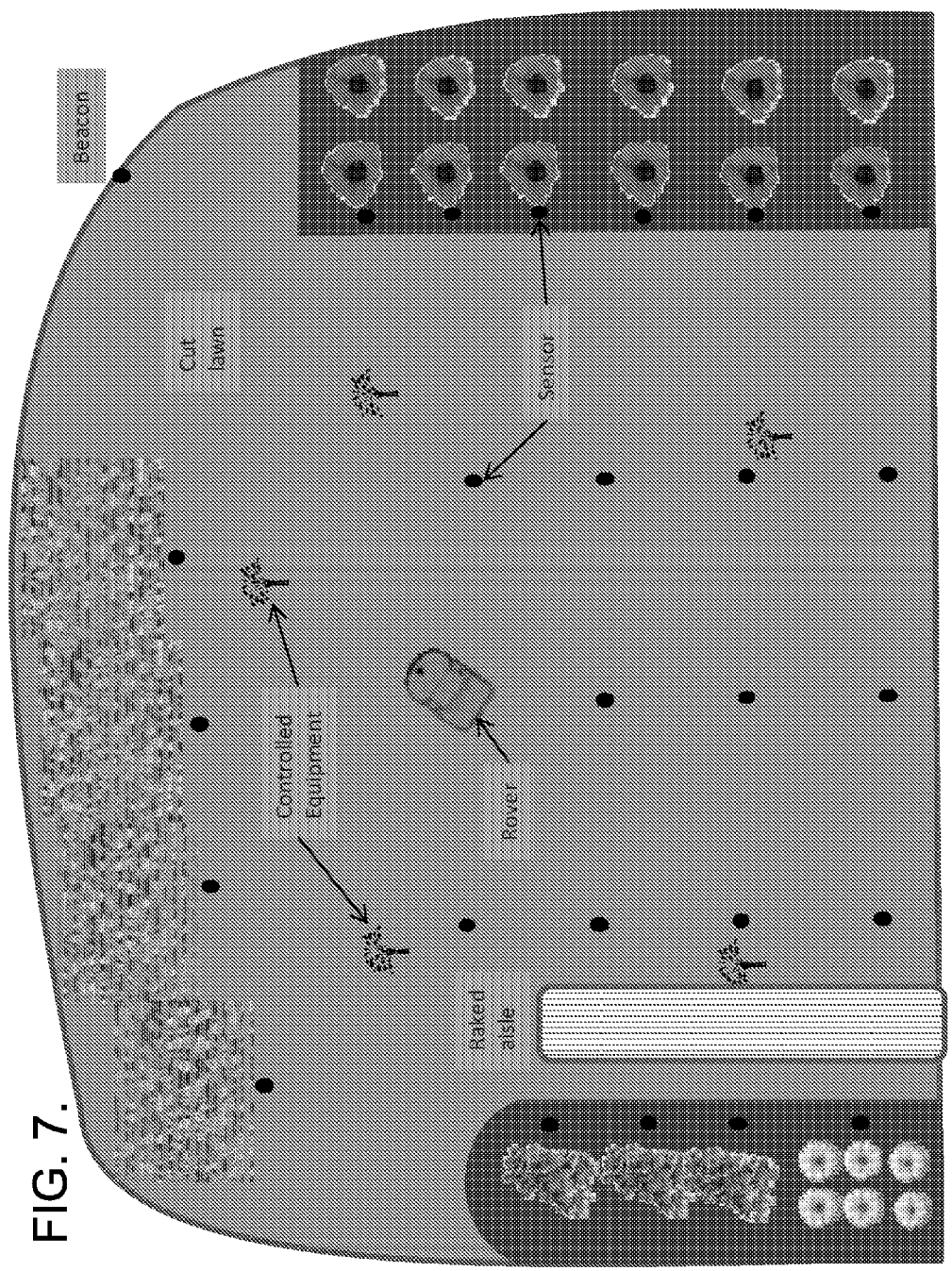
FIG. 7 illustrates a diagram of a parcel with numerous assets thereon, which can be operated using an example embodiment.

FIG. 7 illustrates a diagram of a parcel with numerous assets thereon, which can be operated using an example embodiment. In this regard, FIG. 7 illustrates different plant types in different portions of respective gardens. Each plant (or plant type) has a sensor associated therewith. Sensors are also distributed throughout the yard. Meanwhile, a number of controlled equipment examples (e.g., sprinklers) are distributed throughout the parcel. The parcel is bounded by a wire, but also includes a beacon that can be used as a reference point for ranging and location determining by the rover. The rover may interact with the sensors to power them and/or receive sensor information therefrom. The rover may also interact with the controlled equipment to electronically or mechanically actuate the controlled equipment. Cutting, raking, watering and other activities may therefore be controlled or facilitated using the rover. In this regard, the grass may be cut and/or watered based on the operation of the rover. Meanwhile, the raked aisle may be raked based on the operation of the rover, and various ones of the plants (bushes, flowers, trees, etc.) may also be watered or fertilized based on operation of the rover. As described above, numerous other activities may also be undertaken by the rover to facilitate efficient and effective yard maintenance (e.g., lawn and garden activities).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. A system comprising:
sensor equipment including one or more sensors disposed on a parcel of land;
task performance equipment configured to perform a task on the parcel, the task being associated with generating a result that is enabled to be monitored via the sensor equipment;
a yard maintenance manager configured to interface with the sensor equipment and the task performance equipment to compare measured conditions with predefined conditions to direct operation of the task performance equipment; and
a robot configured to work the parcel, wherein the robot performs at least one of:
acting as one of the one or more sensors,
acting as a device of the task performance equipment, or
interacting with the sensor equipment or the task performance equipment,
wherein the yard maintenance manager comprises processing circuitry configured to store map data descriptive of zones of the parcel such that each of the zones is defined by a corresponding geographic description relative to the map data,
wherein each of the zones is associated with plant data corresponding to at least one plant within a respective one of the zones,
wherein the plant data defines desirable parameters for growth of the at least one plant, and
wherein the sensor equipment receives power and is powered from the robot responsive to the robot passing within a predetermined distance of respective devices of the sensor equipment.

2. The system of claim 1, wherein the sensor equipment communicates with the robot responsive to the robot passing within a predetermined distance of respective devices of the sensor equipment.

3. The system of claim 1, wherein the robot operates relative to a boundary defined by boundary wire.

4. The system of claim 3, wherein the boundary wire is used to power at least one sensor of the sensor equipment.

5. The system of claim 1, wherein the robot is configured to detect information indicative of locations of assets among the sensor equipment or the task performance equipment and communicate the detected information to the yard maintenance manager to enable the yard maintenance manager to determine locations of the assets relative to the parcel.

6. The system of claim 1, wherein the robot is configured to carry at least one sensor of the sensor equipment.

7. The system of claim 1, wherein the robot is configured as a device of the task performance equipment.

8. The system of claim 1, wherein the robot is configured to interact with the sensor equipment or the task performance equipment via mechanical interaction.

9. The system of claim 1, wherein the robot is configured to interact with the sensor equipment or the task performance equipment via electrical interaction.

10. The system of claim 1, wherein the yard maintenance manager compares the measured conditions from the at least one sensor of a particular zone to the plant data associated with the particular zone to determine whether to control the task performance equipment relative to the particular zone to alter conditions therein.

11. The system of claim 1, wherein the yard maintenance manager communicates with an operator via a remote terminal to suggest operator interaction with the task performance equipment.

12. A method comprising:
receiving sensor data from sensor equipment including one or more sensors disposed on a parcel of land;
determining current conditions on the parcel based on the sensor data;
comparing the current conditions to desirable conditions associated with vegetation planted on the parcel of land;
providing at least one instruction relative to operation of task performance equipment configured to perform a task on the parcel, the task being associated with generating a result that is enabled to be monitored via the sensor equipment; and
employing a robot to work the parcel, wherein the robot performs at least one of:
acting as a sensor of the sensor equipment,
acting as a device of the task performance equipment, or
interacting with the sensor equipment or the task performance equipment,
wherein the yard maintenance manager comprises processing circuitry configured to store map data descriptive of zones of the parcel such that each of the zones is defined by a corresponding geographic description relative to the map data,
wherein each of the zones is associated with plant data corresponding to at least one plant within a respective one of the zones,
wherein the plant data defines desirable parameters for growth of the at least one plant, and
wherein the robot is configured to interact with another device of the sensor equipment or another device of the task performance equipment via mechanical interaction to actuate a component of the other device of the sensor equipment or the other device of the task performance equipment.

13. The method of claim 12, wherein employing the robot further comprises employing the robot to power the sensor equipment responsive to the robot passing within a predetermined distance of respective devices of the sensor equipment.

14. The method of claim 12, wherein employing the robot further comprises employing the robot to communicate with the sensor equipment responsive to the robot passing within a predetermined distance of respective devices of the sensor equipment.

15. The method of claim 12, wherein employing the robot comprises employing the robot relative to a boundary defined by boundary wire.

16. The method of claim 15, wherein the boundary wire is used to power at least one sensor of the sensor equipment.

17. A system comprising:
sensor equipment including one or more sensors disposed on a parcel of land;
a yard maintenance manager configured to interface with the sensor equipment to monitor growing conditions on the parcel; and
a robot configured to work the parcel, wherein the robot performs at least one of:
acting as one of the one or more sensors, or
interacting with another of the one or more sensors of the sensor equipment to facilitate monitoring the growing conditions, wherein the yard maintenance manager comprises processing circuitry configured to store map data descriptive of a plurality of zones of the parcel, wherein the robot is configured to operate in the zones to communicate with task performance equipment in the zones and the other of the one or more sensors via a low power communication system and communicate with the yard maintenance manager via a high power communication system.

* * * * *